(12) United States Patent
Yang

(10) Patent No.: US 7,924,551 B2
(45) Date of Patent: Apr. 12, 2011

(54) ELECTRONIC DEVICE

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/613,544

(22) Filed: Nov. 6, 2009

(65) Prior Publication Data

US 2010/0259874 A1  Oct. 14, 2010

(30) Foreign Application Priority Data

Apr. 9, 2009  (CN) .......................... 2009 1 0301448

(51) Int. Cl.
*H05K 5/00* (2006.01)
*H05K 7/00* (2006.01)
*H04M 1/00* (2006.01)

(52) U.S. Cl. ......... 361/679.01; 361/679.27; 361/679.28; 455/575.3

(58) Field of Classification Search ............. 361/679.01, 361/679.27, 679.28, 679.55; 455/575.3
See application file for complete search history.

(56) References Cited

U.S. PATENT DOCUMENTS

| 5,278,725 | A | 1/1994 | Konno et al. | |
| 6,445,385 | B1 * | 9/2002 | Shin et al. | 345/204 |
| 6,512,670 | B1 * | 1/2003 | Boehme et al. | 361/679.29 |
| 7,787,242 | B2 * | 8/2010 | Schwager et al. | 361/679.28 |

* cited by examiner

*Primary Examiner* — Jayprakash N Gandhi
*Assistant Examiner* — Anthony M Haughton
(74) *Attorney, Agent, or Firm* — Frank R. Niranjan

(57) ABSTRACT

An electronic device includes a first body; a second body; a hinge pivotally connecting the second body to the first body and defining two fixing holes along the axial direction thereof; two conductive post received in the two fixing holes correspondingly, two first cables disposed in the first body; and two second cables disposed in the second body. A first extending portion and a second extending portion of each of the two conductive post extending out of the hinge. The two first extending portions of the two conductive posts having different length. The two first cables conductively fixed at the first extending portion. The two second cables conductively fixed at an end of each of the second extending portions opposite to the hinge and capable of rotating with respect to the hinge without getting entangled.

16 Claims, 3 Drawing Sheets

ELECTRONIC DEVICE

1. TECHNICAL FIELD

The present disclosure relates to electronic device, and particularly to a electronic device having a hinge.

2. DESCRIPTION OF RELATED ART

Most electronic device includes a main body, a display body, and a hinge pivotally connecting the display body to the main body. The main body and the display body are connected by cables to communicate with each other. However, the cables often becomes entangled that cause strain on the cables and as a result, the cables may be damaged. Thus, communication between the main body and the display body is lost.

Therefore, it is desirable to provide an electronic device capable of alleviating damage to cables.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
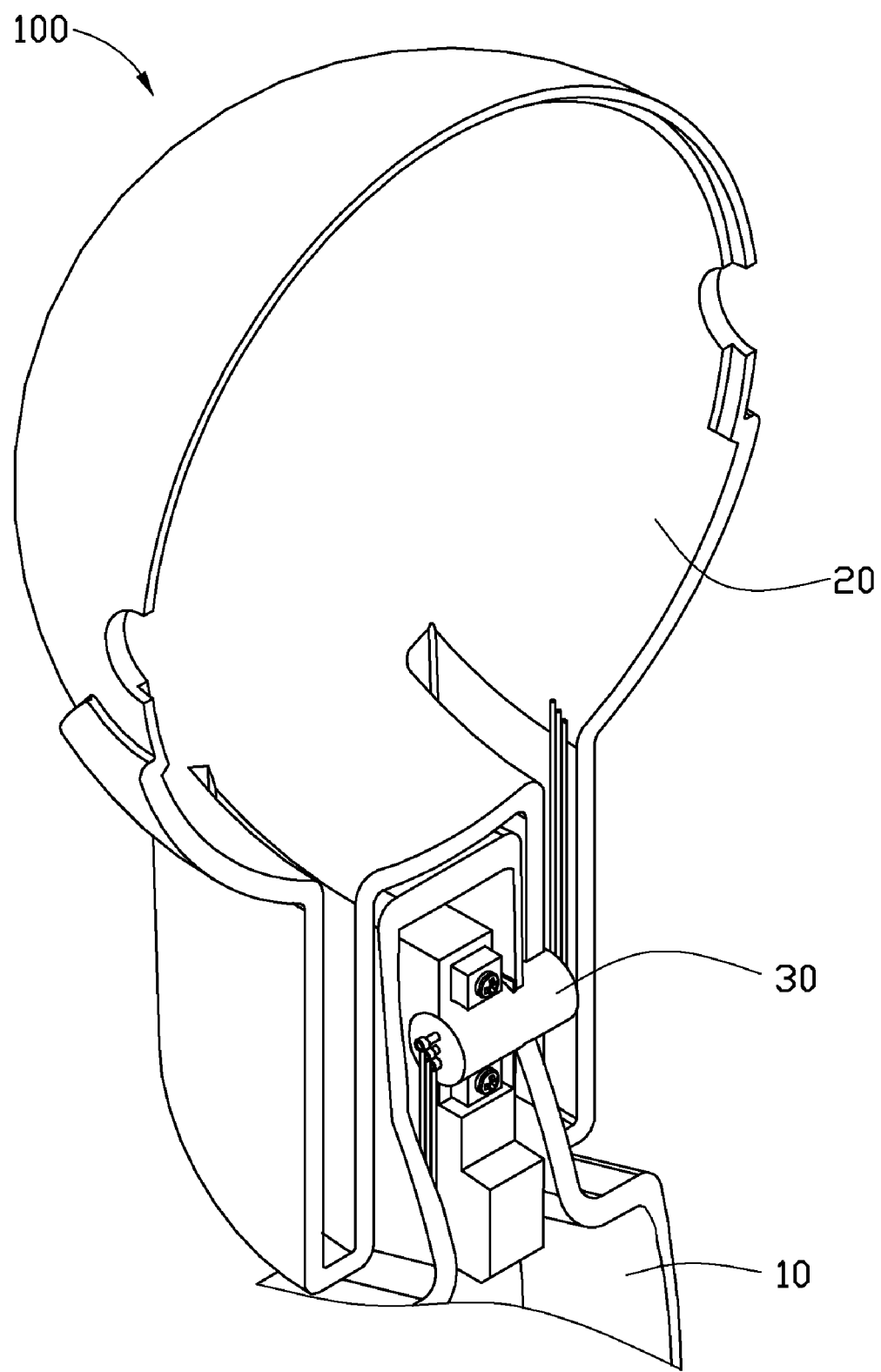
FIG. 1 is an isometric view of an electronic device according to an exemplary embodiment.

Referring to FIG. 1, an electronic device 100 according to an exemplary embodiment includes a first body 10, a second body 20, and a hinge assembly 30 pivotally connecting the first body 10 and the second body 20. In the embodiment, the electronic device 100 is a robot, the first body 10 is a main, the second body 20 is a head. In other embodiments, the electronic device 100 may be a notebook computer, a portable media player, and a mobile phone.

Figure 2:
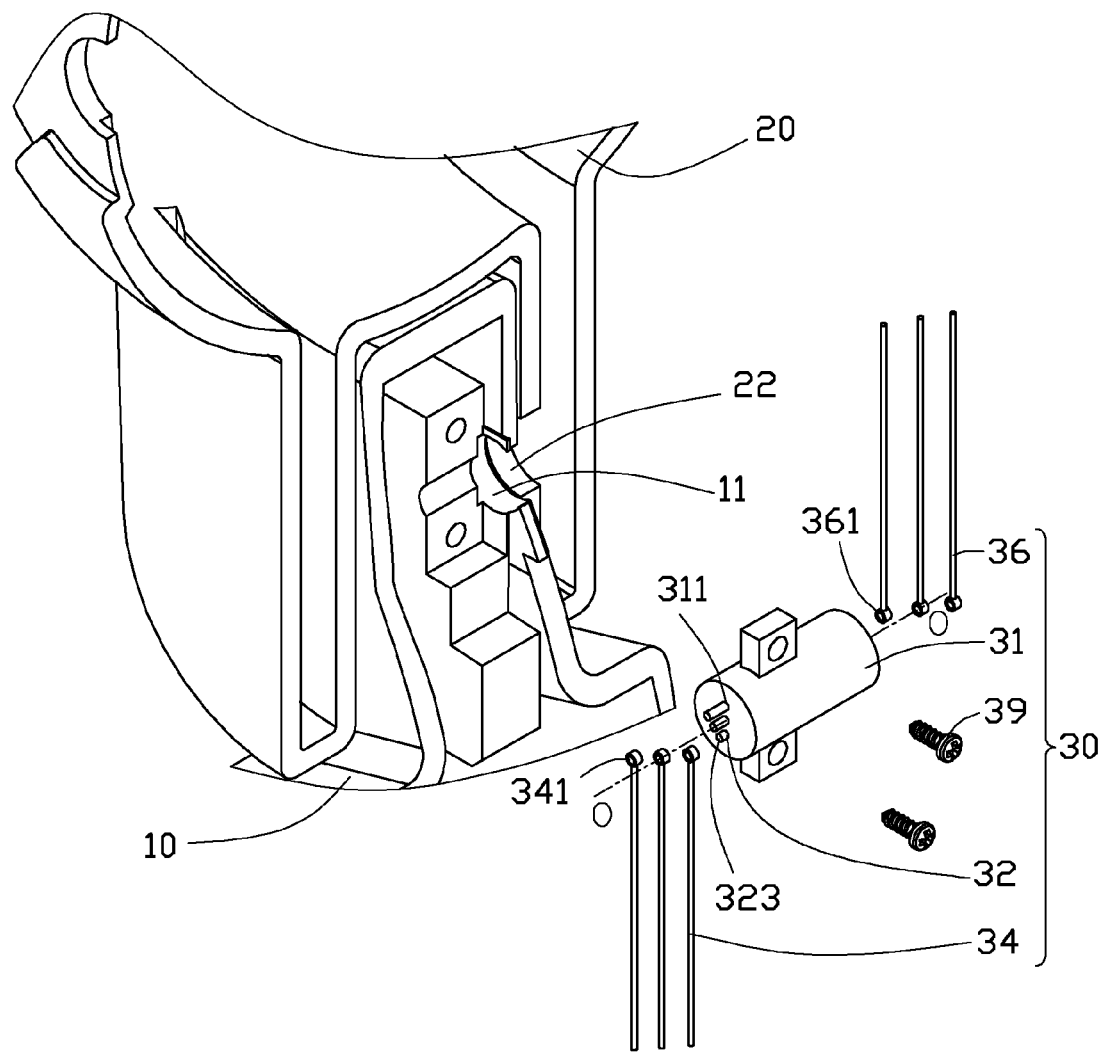
FIG. 2 is a partial exploded isometric view of the electronic device of FIG. 1.
Figure 3:
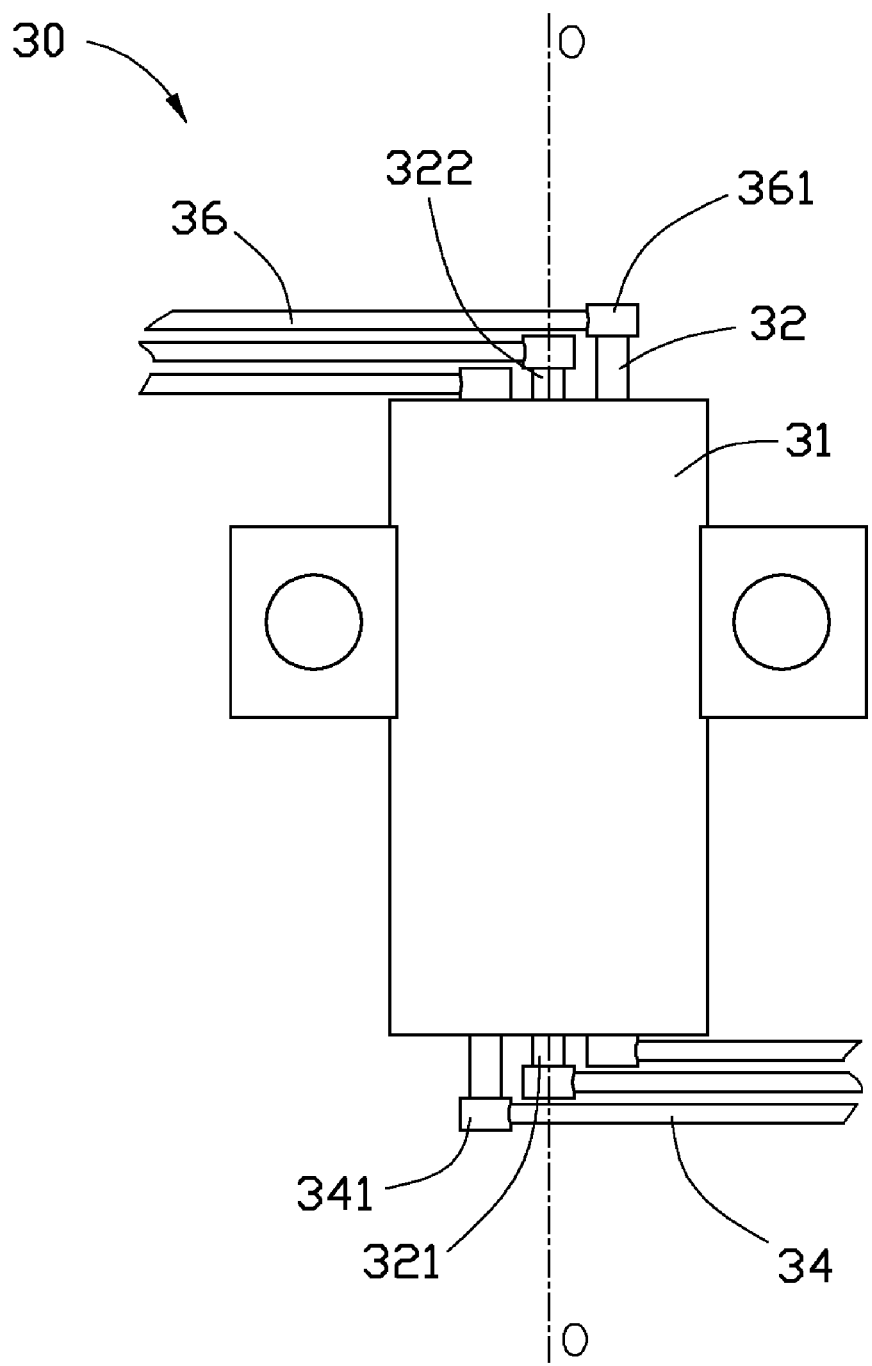
FIG. 3 is a side view of a hinge assembly of the electronic device of FIG. 1.

Referring to FIGS. 2 and 3, the first body 10 defines a first pivot hole 11. The second body 20 defines a second pivot hole 22 corresponding to the first pivot hole 11.

The hinge assembly 30 includes a hinge 31, three conductive posts 32, three first cables 34, and three second cables 36.

One end of the hinge 31 is fixed in the first body 10, after passing through the first pivot hole 11, by screws 39. The other end of the hinge 31 is inserted through the second pivot hole 22 to pivotally attach the second body 20 to the first body 10. Therefore, the second body 20 is capable of rotating with respect to the first body 10 around the axial line OO of the hinge 31. Three fixing holes 311 are defined in the hinge 31 along the axial line OO, and arranged in a line along the radial direction of the hinge 31. The line along the radial direction of the hinge 31 is perpendicular to the axial line OO. Each of three fixing holes 311 is opened at opposite ends of the hinge 31 in the axial line OO.

The three conductive posts 32 have the same length, and are disposed in the three fixing holes 311 correspondingly. A first extending portion 321 and a second extending portion 322 of each of the three conductive posts 32 extend out of the opposite ends parallel to the axial line OO. The second extending portion 322 is opposite to the first extending portion 321. Length of the first extending portions 321 of the three conductive posts 32 gradually changes in the lines parallel to the axial line OO which the three fixing holes 311 are arranged in. That is, ends 323 of the three first extending portions 321 or the three second extending portions 322 away from the hinge 31 are located in three different planes which are perpendicular to the axial line OO.

In the embodiment, the lengths of the first extending portion 321 of the three conductive posts 32 along the axial line OO are gradually decreased in the line which the three fixing holes 311 are arranged in, and the lengths of the second extending portion 322 of the three conductive posts 32 along the axial line OO are gradually increased in the line which the three fixing holes 311 are arranged in.

The three first cables 34 are disposed in the first body 10, and used for electrically connecting with electronic components (not shown) disposed in the first body 10 with the first extending portions 321 of the three conductive posts 32 correspondingly. Each of the three first cables 34 includes a ring at an end for sleeving on an end of the first extending portions 321 opposite to the hinge 31. Therefore, the three first cables 34 is rotatable in the three different planes which are perpendicular to the axial line OO without interference with each other, and do not get entangled.

The three second cables 36 are disposed in the second body 20, and used for electrically connecting with electronic components (not shown) disposed in the second body 20 with the second extending portions 322 of the three conductive posts 32 correspondingly. Each of the three second cables 36 includes a ring at an end for sleeving on an end of the second extending portions 322 opposite to the hinge 31. Therefore, the three second cables 36 is rotatable in the three different planes which are perpendicular to the axial line OO without interference with each other, and do not get twisted and pulled causing strain.

Therefore, when the second body 20 rotates with respect to the first body 10, the three second cables 36 rotates in three different planes which are perpendicular to the axial line OO without interference with each other, therefore, the three second cables 36 is protected from getting twisted and pulled causing strain. When the first body 10 rotates with respect to the second body 20, the three first cables 34 in three different planes which are perpendicular to the axial line OO without interference with each other, therefore, the three first cables 34 is protected from getting entangled.

In the embodiment, the number of the fixing holes 311 are three, in other embodiments, the number of the fixing holes 311 may be two, four, and more, and the number of the conductive posts 32, the first cables 34, and the second cables 36 are two, four, and more correspondingly.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device, comprising:
   a first body;
   a second body;

a hinge pivotally connecting the second body to the first body; the hinge defining two fixing holes along an axial direction thereof;

two conductive posts received in the two fixing holes correspondingly, a first extending portion and a second extending portion of each of the two conductive posts extending out from opposite sides of the hinge, the two first extending portions of the two conductive posts having different length along the axial direction;

two first cables disposed in the first body and conductively fixed at the first extending portions respectively; and two second cables disposed in the second body and conductively fixed at the second extending portions, the two second cables capable of rotating with respect to the hinge without getting entangled.

2. The electronic device of claim 1, wherein the two conductive posts have the same length, the two first cables are rotatably fixed at an end of each of the first extending portion opposite to the hinge.

3. The electronic device of claim 1, wherein the two second extending portions have different length, the two first cables are rotatably fixed at an end of each of the first extending portion opposite to the hinge.

4. The electronic device of claim 1, wherein the hinge is fixed on the first body.

5. The electronic device of claim 4, wherein the first body defines a first pivot hole, the second body defines a second pivot hole, the hinge passes through the first pivot hole and the second hole to pivotally attached the second body on the first body.

6. The electronic device of claim 1, wherein each of the two second cables and the two first cables sleeves on the second extending portions and the first extending portions correspondingly.

7. An electronic device, comprising:
a first body;
a second body;
a hinge enabling the second body to pivotally attach to the first body, the hinge defining at least two fixing holes along an axial direction thereof;
at least two conductive posts disposed in the at least two fixing holes correspondingly, each of the at least two conductive posts comprising a first extending portion extending out of hinge, and
at least two first cables disposed in the first body and conductively fixed on the first extending portions correspondingly, the at least two first cables rotating in three different planes perpendicular to the axial direction of the hinge.

8. The electronic device of claim 7, further comprising at least two second cables disposed in the second body, each of the at least two conductive posts comprises a second extending portion extending out of hinge opposite to the first extending portion, the at least two second cables are conductively fixed on the second extending portions correspondingly and capable of rotating with respect to the second extending portions.

9. The electronic device of claim 8, wherein the at least two second cables are capable of rotating in three different planes perpendicular to the axial direction of the hinge.

10. The electronic device of claim 9, wherein the at least two first cables and the at least second cables sleeve on the first extending portions and the second extending portions respectively.

11. The electronic device of claim 9, wherein the number of the at least two fixing holes, the at least two first cables, the at least two second cables, and at least two conductive posts is three, the number of the first extending portions and the second extending portions is three correspondingly.

12. The electronic device of claim 11, wherein the three fixing holes are arranged in a line.

13. The electronic device of claim 12, wherein the length of the three first extending portions is gradually changed in the line which the three fixing holes arranged in.

14. The electronic device of claim 13, wherein the length of the three first extending portions is gradually decreased in the line which the three fixing holes arranged in.

15. The electronic device of claim 12, wherein ends of the three first extending portions or the three extending portions opposite to the hinge are located in three different planes which are perpendicular to the axial direction.

16. The electronic device of claim 7, wherein the hinge is fixed on the second body.

* * * * *